March 28, 1967 B. F. WEHMER 3,310,915
TRIMMER MACHINE
Filed Oct. 30, 1963 2 Sheets-Sheet 1
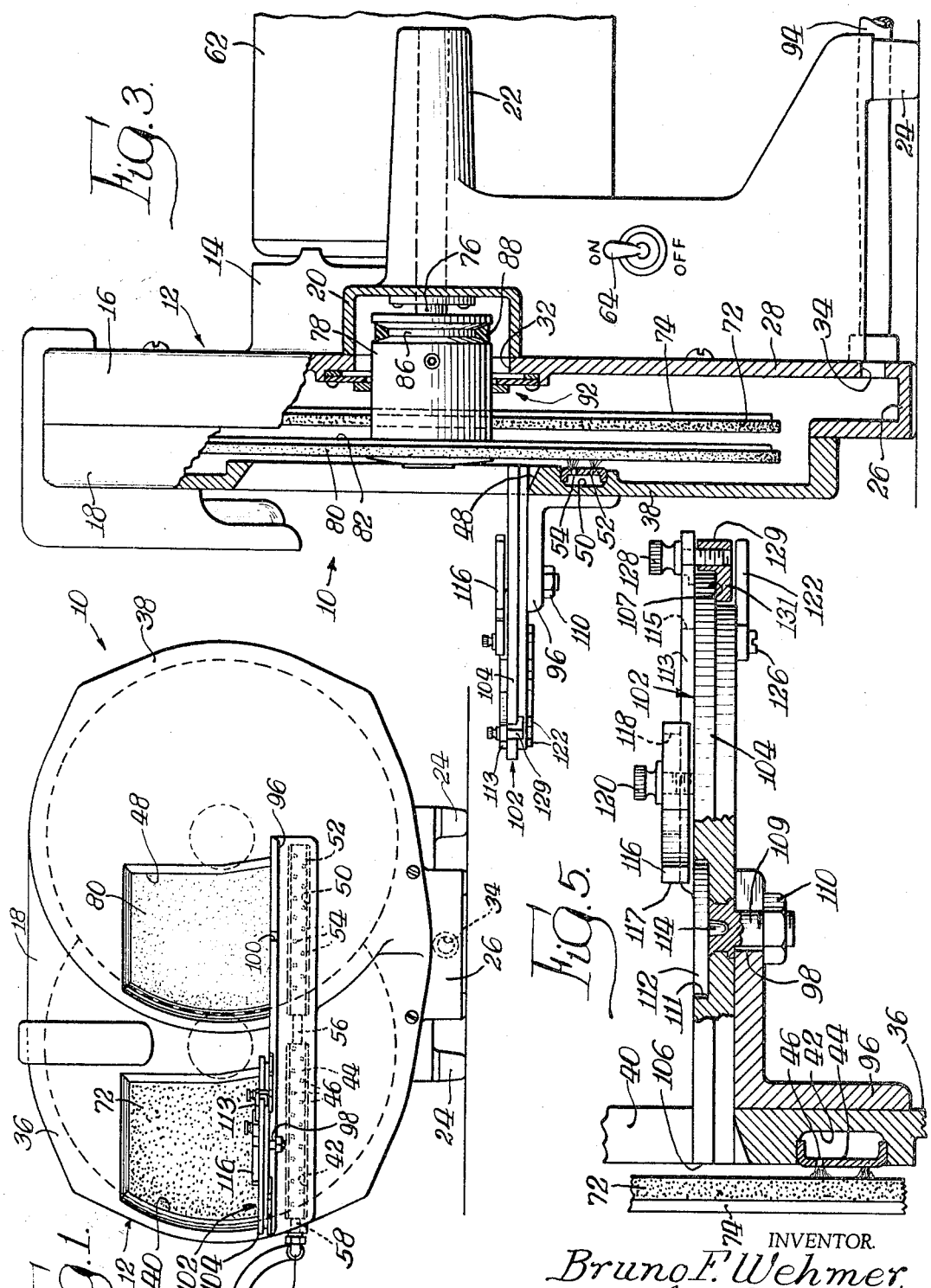
INVENTOR.
Bruno F. Wehmer,
BY

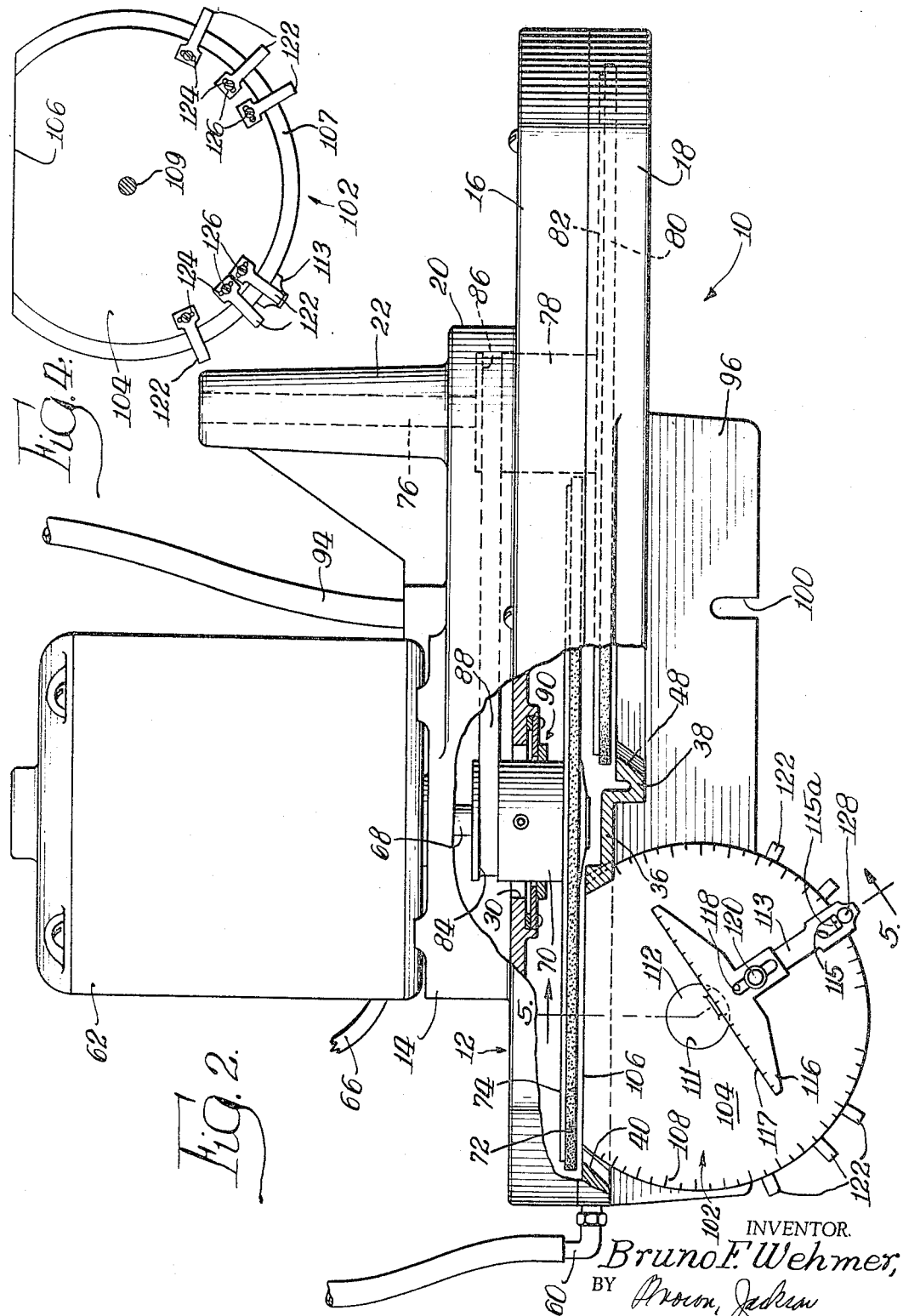

United States Patent Office 3,310,915
Patented Mar. 28, 1967

3,310,915
TRIMMER MACHINE
Bruno F. Wehmer, 740 Old Dobbin Road,
Lexington, Ky. 40502
Filed Oct. 30, 1963, Ser. No. 320,086
9 Claims. (Cl. 51—128)

My present invention relates generally to trimmer machines and more particularly to machines for trimming or grinding dental or orthodontic models.

In the preparation of a dental model or plaster cast representing the teeth and adjacent mouth tissues of a patient, the base of the model is customarily trimmed or ground away to form facets thereabout. Normally, the model will be formed with six facets, three on each side of the median plane of the model, which serve, for example, to facilitate alignment of upper and lower casts. Dental models with facets about the sides thereof are presently prepared in several different ways. In one case, the dental model is rough ground with a single power rotated abrasive disc and then hand finished with files or the like. Due to the hand finishing operation, this procedure is expensive, time consuming and lacks accuracy. In another case, the dental model is first rough ground on a coarse grain abrasive disc mounted on a single disc grinder, the coarse disc is replaced with a fine grain abrasive disc, and the dental model is finished on the fine grain disc. This procedure is disadvantageous since it requires repeated interchanging of a course grain disc and a fine grain disc in the cource of preparing a series of models. In still other cases, two separate grinding machines, one having a coarse grain disc and the other having a fine grain disc, are used side-by-side. The use of two grinding machines has proved unsatisfactory because they consume valuable laboratory space and require duplicate coolant connections when the technique of wet grinding is employed.

It is an object of my present invention to provide a dental trimmer machine which comprises two abrasive discs which are of dissimilar coarseness and which are power driven concurrently from a common source.

It is another object of my present invention to provide a dental trimmer machine, as described, wherein the abrasive discs are rotatable about parallel axes lying in a horizontal plane.

It is a further object of my present invention to provide a dental trimmer machine, as described, wherein the abrasive discs are axially spaced and arranged in overlapping relationship.

It is a still further object of my present invention to provide a dental trimmer machine, as described, wherein the abrasive discs are supported by hub members, drive means is provided for effecting rotation of one of the hub members, and power transmission means interconnects the hub member for effecting conjoint rotation thereof.

A still further object of my present invention is to provide a dental trimmer machine, as described, wherein the abrasive discs are enclosed within a housing having closely spaced access opening means in the forward wall thereof through which dental models may be presented to the faces of the abrasive discs for trimming.

Still another object of my present invention is to provide a dental trimmer machine, as described, wherein coolant distribution means is arranged in the front wall of the housing for spraying coolant on the faces of the abrasive discs, and wherein the hub members extend through an intermediate wall of the machine housing and have seal means disposed thereabout which serves to prevent coolant and foreign material from reaching the drive means mounted rearwardly of the intermediate wall.

A dental trimmer machine built in accordance with the principles of my present invention provides inexpensive and accurate trimming due to the use of two abrasive discs, is compact in construction due to the arrangement of the discs is overlapping relationship, and has optimum operational efficiency due to the close spacing of the access openings.

In finishing the facets of a dental model, the angular relationship of the facets will vary among dentists, but will normally remain consistent for all models of a particular dentist. Heretofore, a multi-position guide member has been used for guiding dental models being presented to an abrasive disc. Since six angle settings are necessary to finish each model, and because numerous resettings of the guide member are required for a series of models, experience has shown that the guide member may be easily mislocated due to a misreading of the angle graduations.

It is an object of my present invention to provide an angulation table assembly for a dental trimmer machine whereby the plurality of angular positions of a guide member necessary to finish a model may be quickly and accurately established without the necessity of repeatedly reading angle graduations.

In accomplishing the latter object, I provide an angulation table that is adapted to be arranged in front of an abrasive disc. The angulation table comprises a horizontal plate member having at least a partial circular periphery and index tabs secured at preselected angular positions about the underside of the plate member and extending beyond the periphery thereof. A radius bar, which at its inner end is pivotally mounted on the plate member at the center of the radius of curvature thereof and at its outer end extends beyond the periphery thereof, is manually alignable with the index tabs individually whereby the radius bar may be disposed in the preselected angular positions corresponding to the location of the index tabs. Since the radius bar need only be aligned with the index tabs to establish the correct angular positions, once the index tabs have been located reading of angle graduations thereafter is unnecessary. Clamp means is provided for releasably clamping the radius bar to the plate member at any preselected angular position, and adjustably mounted on the radius bar is a crosshead for guiding dental models being presented to the abrasive disc.

Now in order to acquaint those skilled in the art with the manner of constructing and using devices in accordance with the principles of my present invention, I shall describe in connection with the accompanying drawings, a preferred embodiment of my invention.

In the drawings:

FIGURE 1 is a front elevation view of the dental trimmer machine of my present invention;

FIGURE 2 is a plan view, on an enlarged scale, of the dental trimmer machine of FIGURE 1, with portions of the housing being broken away to show the interior thereof, and with the angulation table being shown in one operative position;

FIGURE 3 is a side elevational view of the dental trimmer machine of FIGURE 2, with portions of the housing being broken away to show the interior thereof, and with the angulation table being shown in a second operative position;

FIGURE 4 is a bottom plan view of the angulation table of my present invention; and FIGURE 5 is a fragmentary sectional view, on a further enlarged scale, of the angulation table of my present invention, taken substantially along the line 5—5 in FIGURE 2, looking in the direction indicated by the arrows.

Referring now to the drawings, there is indicated generally by the reference numeral 10 one embodiment of dental trimmer machine in which the principles of my present invention have been incorporated. The supporting frame and housing 12 of the machine 10 comprises a rear housing section 14, an intermediate housing section 16, and a forward housing section 18. The rear housing section 14 is formed with an open front wall, a laterally extending channel arm 20 that is open in a forward direction, a tubular portion 22 projecting rearwardly from the channel arm 20, and a pair of laterally spaced foot members 24. The intermediate housing section 16 is formed with an open front wall, a lower well portion 26, and a rear wall 28 that is suitably secured, as by screws, to the forward face of the rear housing section 14. The rear wall 28 of the intermediate housing section 16 is provided with an opening 30 (FIGURE 2) and openings 32 and 34 (FIGURE 3). The forward housing section 18, which is suitably secured, as by screws, about the periphery of the open front wall of the intermediate housing section 16, is formed with an open rear wall, and a forward wall 36 having a forwardly offset portion 38. The several housing sections may, for example, be fabricated of metal castings or stampings in a conventional manner.

The forward wall 36 of the forward housing section 18 is provided with an access opening 40, and with a rearwardly facing horizontal groove 42 therebelow in and along which is mounted a C-shaped channel member 44 having a plurality of orifices 46 therein. The offset wall portion 38 is formed with a corresponding access opening 48, and with a rearwardly facing horizontal groove 50 therebelow in and along which is mounted a C-shaped channel member 52 having a plurality of orifices 54 therein. The pairs of grooves 42 and 50, and associated channel members 44 and 52, serve to define fluid passageways, which are interconnected by a port 56, and which are adapted to be connected to a source of liquid coolant, such as water, through a port 58 and hose and coupling means 60. Coolant entering the grooves 42 and 50 of the described coolant distribution means is discharged in a spray through the orifices 46 and 54 for a purpose to be discussed hereinafter.

Secured to the rear wall of the rear housing section 14 is drive means 62 in the form of an electric motor. The electric motor 62 is adapted to be connected with a source of electrical power through a conventional switch 64 (FIGURE 3) and a cable 66 (FIGURE 2). The drive shaft 68 of the electric motor 62, as shown in FIGURE 2, extends through the rear housing section 14 and into the intermediate housing section 16, and has secured thereon a hub member 70. The hub member 70 serves to support at its forward end an abrasive wheel or disc 72 and a reinforcing back-up plate 74. As shown in FIGURE 3, a shaft 76, which is journalled in the tubular portion 22 of the rear housing section 14, extends forwardly through the channel arm 20 and into the intermediate housing section 16, and has suitably secured thereon a hub member 78 which serves to support at its forward end an abrasive wheel or disc 80 reinforced by a back-up plate 82.

The abrasive discs 72 and 80 preferably are of similar diameter, are rotatable about parallel axes lying in a horizontal plane, and are disposed intermediate of the housing walls 28 and 38. In addition, the disc 80 is spaced axially forwardly of the disc 72, and the axes of rotation of the discs are spaced apart a distance less than the diameter of the discs whereby the discs are arranged in overlapping relationship. The faces of the abrasive discs 72 and 80 are arranged to be rotated past the access openings 40 and 48 respectively. Thus, dental models may be presented through the access openings 40 and 48 to the faces of the abrasive discs 72 and 80 for trimming. Preferably, the discs 72 and 80 are of dissimilar grain size so that rough trimming or grinding of a dental model may be done with one disc and fine trimming or grinding with the other disc. More particularly, the abrasive disc 72 may be of coarse grain size and the disc 80 of fine grain size. By virtue of the described arrangement of mounting the discs 72 and 80, the width-wise extent of the dental trimmer machine is maintained at a minimum.

The hub members 70 and 78 are respectively formed with annular grooves 84 and 86 which receive an endless belt 88 that serves as power transmission means whereby the hub member 78 is adapted to be rotated conjointly with the hub member 70 when the electric motor 62 is energized. Suitable fluid seal assemblies 90 and 92 are disposed about the hub members 70 and 78, respectively, and are secured to the inner faces of the rear wall 28 of the intermediate housing section 16. Coolant, which is discharged through the orifices 46 and 54, is sprayed on the forward faces of the abrasive discs 72 and 80 whereby to cool the same and improve the grinding operation. The seal assemblies 90 and 92 prevent coolant and foreign material from passing through the wall openings 30 and 32 and into the rear housing portion 14. Coolant and foreign material flowing from the abrasive discs 72 and 80 is collected in the well portion 26 of the intermediate housing section 16. A suitable drain hose 94 is connected with the opening 34 in the rear wall 28 of the intermediate housing section 16 for draining fluid and foreign material from the well portion 26.

I shall now describe the means that I provide for guiding dental models during presentation thereof to the abrasive discs 72 and 80 for trimming. Extending along and secured to the front face of the forward wall 36 and offset wall portion 38, immediately below the access openings 40 and 48, is a generally inverted L-shaped angle iron member or sill 96 having laterally spaced slots 98 and 100 formed in the forward edge thereof. The member 96 serves to support an angulation or guide table indicated generally by the reference numeral 102. The angulation table 102 comprises a generally circular plate 104, which has one chordal section removed thereby defining a straight edge 106, and which has a peripheral flange portion 107 of reduced thickness. In the particular application of my invention disclosed herein, the forward-most point of the plate 104, which lies in a vertical plane passing through the center of the radius of curvature of the plate 104 perpendicular to the straight edge 106, is marked 0°. On each side of this point, the curved periphery of the plate 104 is graduated in degrees of an arc and subdivisions thereof, as at 108. Secured in and extending downwardly from the plate 104 is a screw 109. The body portion of the screw 109 is adapted to be slidably received in either of the slots 98 or 100 and has threaded thereon a nut 110 that may be tightened for securing the angulation table to the sill 96. When the screw 109 is disposed in the slot 98, the straight edge 106 extends along the lower edge of the access opening 40 and the angulation table 102, as shown in FIGURE 2, is thus aligned with the abrasive disc 72; when the screw 109 is disposed in the slot 100, the straight edge 106 extends along the lower edge of the access opening 48 and the angulation table 102, as shown in FIGURE 3, is then aligned with the abrasive disc 80. As will be readily appreciated, either a single angulation table 102 may be used interchangeably in the two described operating positions, or two angulation tables may be mounted side-by-side.

The plate 104, at the center of its radius of curvature, is formed with a circular recess 111 which receives the downwardly offset inner end 112 of a radius bar 113. The offset end 112 is formed with a depending pivot projection 114 that fits in a recess in the upper end of the screw 109. The outer end of the radius bar 113 extends beyond the periphery of the plate 104 and is formed with an elongated aperture 115 that overlies the graduations 108. The radius bar 113 adjacent the forward edge of the aperture 115 is provided with an index 115a that may be aligned with any of the graduations 108. Disposed transversely of the radius bar 113 is a crosshead 116, which has a straight guide edge 117, and which is formed with an elongated aperture 118 through which a thumb screw 120 is disposed and threaded into the radius bar 113. The crosshead 116 is adapted to be adjusted lengthwise of the radius bar 113 and locked in position by means of the thumb screw 120.

In the preparation of a dental model or plaster cast, it is customary to trim or grind away the base of each model to form facets thereabout, which in the usual case number six, three on each side of the median plane of the model. Although the specific angles of the facets will vary among dentists, a consistent angular relationship is normally maintained for all models of a particular dentist. To facilitate placement of the radius arm 113 in each of the six angular positions necessary to finish a model, and to permit the same angular positions to be accurately established for successive models, I shall now describe the indexing means which I associate with the radius arm 113.

As best shown in FIGURE 4, a plurality of index tabs 122 are arranged about the underside of the circular plate 104 and project radially beyond the periphery thereof. Each index tab 122 is formed at its inner end with a crosswise elongated aperture 124 through which extends a set screw 126 that is threaded into the plate 104. These index tabs 122, through alignment with the appropriate graduations 108, are adapted to be located at various preselected angular positions about the underside of the plate 104; and the arrangement of the apertures 124 and screws 126 is such as to permit a fine adjustment of the angular positions of the index tabs 122. After the index tabs have been suitably positioned, the radius bar 113 may be conveniently located in one of the preselected angular positions by simply aligning the outer end thereof with the index tab 122 corresponding to the desired angle and releasably locking the same in position. For this purpose I provide clamping means in the form of a thumb screw 128 which, as shown in FIGURE 5, extends through the outer end of the radius bar 113 and is threaded into a clamp member 129 having a foot portion 131 arranged to engage the underside of the peripheral plate flange 107 upon tightening of the screw 128.

In using the trimmer machine of my present invention, the index tabs 122 are first located at the desired angular positions about the underside of the plate 104. By way of illustration, if each side of a dental model is to be presented to the faces of the abrasive discs 72 and 80 at angles of 25°, 55°, and 65°, the index tabs 122 are secured in angular positions corresponding to the 25°, 55° and 65° graduations on each side of the 0° marking on the plate 104. Next, the angulation table 102 is secured in position adjacent the access opening 40 and the coarse abrasive disc 72 (FIGURE 2). Then, the outer end of the radius bar 113 is aligned with one of the index tabs 122 and clamped to the plate flange 107, and the crosshead 116 is adjusted lengthwise of the radius bar 113 as may be required by the size of the model to be trimmed. Upon completion of these preliminary adjustments, the motor 62 is energized and the model is manually held on the plate 104 and slid along the guide edge 117 of the crosshead 116 through the access opening 40 and into engagement with the face of the coarse abrasive disc 72. After one facet of the model has been rough ground at the proper angle, the radius bar 113 is moved and clamped successively in overlying relation to the other index tabs 122, and the dental model is presented successively to the abrasive disc 72 at the several preselected angles until all six facets have been rough ground. At this time, the angulation table 102 is removed from the position in front of the abrasive disc 72 (FIGURE 2) and secured in position in front of the access opening 48 and the fine abrasive disc 80 (FIGURE 3). In the manner previously described, the radius bar 113 is successively moved to the six angular positions corresponding to the locations of the index tabs 122, and the dental model is presented at these six angles to the abrasive disc 80 to finish grind the facets. It will be readily understood that if an angular setting other than one corresponding to one of the index tabs 122 is desired, the radius bar 113 may be moved until the index line 115a is aligned with the appropriate graduation 108, and then clamped in this position. Thus, although the radius bar 113 normally will be positioned by use of the tabs 122, the bar 113 may be positioned independently of the tabs 113 by use of the index line 115a.

From the foregoing description it will be appreciated that I have provided a dental trimmer machine that is capable of quickly, accurately and inexpensively trimming dental models. By providing a pair of abrasive discs which are of dissimilar coarseness and which are power driven concurrently from a common electric motor both coarse and fine trimming of a dental model may be accomplished mechanically. Additionally, my trimmer machine is compact in construction and has a minimum width-wise extent due to the arrangement of the discs in overlapping relationship. This construction conserves valuable laboratory space, eliminates interchanging of discs, and permits the use of a single coolant connection. Also, by closely spacing the access openings movement of the machine operator using both discs is minimized and optimum operational efficiency is thus attained. Finally, I have provided an angulation table, which permits a dental model to be presented to the abrasive discs in any one of a plurality of angular positions without the necessity of repeatedly reading angle graduations, and which permits the model to be presented at the same angles to both discs.

While I have shown and described what I believe to be a preferred embodiment of my present invention, it will be understood by those skilled in the art that various rearrangements and modifications may be made therein without departing from the spirit and scope of my invention.

I claim:

1. A dental trimmer machine comprising a housing having a front wall with access opening means therein, a pair of abrasive discs within said housing, means for rotating said abrasive discs, and horizontal elongated coolant distribution means in said front wall for spraying coolant on said abrasive discs.

2. A dental trimmer machine comprising a housing having a front wall with access opening means therein, a pair of abrasive discs within said housing, said abrasive discs being rotatable about parallel axes lying in a horizontal plane and being axially spaced and arranged in overlapping relationship, means for rotating said abrasive discs, and coolant distribution means in said front wall for spraying coolant on said abrasive discs.

3. A dental trimmer machine comprising a housing having a front wall and an intermediate wall, a pair of abrasive discs within said housing intermediate said front and intermediate walls, said abrasive discs each being supported by a hub member, said hub members being rotatable about parallel axes lying in a horizontal plane, said abrasive discs being axially spaced and arranged in overlapping relationship, said intermediate wall having openings through which said hub members extend, drive means rearwardly of said intermediate wall for effecting rotation of said hub members, seal means about said hub members and said openings, and coolant distribution means in said front wall for spraying coolant on said abrasive discs.

4. A dental trimmer machine comprising a pair of abrasive discs rotatable about parallel axes lying in a horizontal plane, said discs being axially spaced and arranged in overlapping relationship, means for rotating said abrasive discs, said abrasive discs being enclosed within a housing having access opening means in the forward wall thereof through which dental models may be presented to the faces of said abrasive discs for trimming, an angulation table arranged forwardly of at least one of said abrasive discs adjacent the access opening thereat, said angulation table comprising a horizontal plate member having at least a partail circular periphery, at least one index tab secured at a preselected angular location to the underside of said plate member and extending beyond the periphery thereof, a radius bar at its inner end being pivotally mounted on said plate member at the center of the radius of curvature thereof and at its outer end extending beyond the periphery thereof, the outer end of said radius bar being manually alignable with said index tab whereby said radius bar is disposed in the preselected angular location, and a crosshead adjustable lengthwise of said radius bar for guiding dental models being presented to the abrasive discs.

5. For use with a trimmer machine having an abrasive disc rotatable about a horizontal axis, an angulation table arranged forwardly of the abrasive disc comprising a horizontal plate member having at least a partial circular periphery, at least one index tab secured at a preselected angular location to the underside of said plate member and extending beyond the periphery thereof, a radius bar at its inner end being pivotally mounted on said plate member at the center of the radius of curvature thereof and at its outer end extending beyond the periphery thereof, the outer end of said radius bar being manually alignable with said index tab whereby said radius bar is disposed in the preselected angular location, and a crosshead adjustable lengthwise of said radius bar.

6. The combination of claim 5 wherein the outer end of said radius bar is provided with means for releasably locking said radius bar to said plate member.

7. For use with a dental trimmer machine having an abrasive disc rotatable about a horizontal axis, an angulation table arranged forwardly of the abrasive disc comprising a horizontal plate member having at least a partial circular periphery, the circular peripheral portion being graduated in degrees of an arc, at least one index tab adjustably secured at a preselected angular location to the underside of said plate member and extending beyond the periphery thereof, a radius bar at its inner end being pivotally mounted on said plate member at the center of the radius of curvature thereof and its outer end extending beyond the periphery thereof, said radius bar having an opening therein overlying said graduations, the outer end of said radius bar being manually alignable with said index tab whereby said radius bar is disposed in the preselected angular location, and a crosshead adjustable lengthwise of said radius bar for guiding dental models being presented to the abrasive disc.

8. For use with a dental trimmer machine having an abrasive disc rotatable about a horizontal axis, an angulation table arranged forwardly of the abrasive disc comprising a horizontal plate member having at least a partial circular periphery, the circular peripheral portion of said plate member being graduated in degrees of an arc, a plurality of index tabs adjustably secured at preselected angular locations to the underside of said plate member and extending beyond the periphery thereof, a radius bar at its inner end being pivotally mounted on said plate member at the center of the radius of curvature thereof and at its outer end extending beyond the periphery thereof, the outer end of said radius bar being manually alignable with one of said index tabs whereby said radius bar may be disposed in any one of the several preselected angular locations, and a crosshead adjustable lengthwise of said radius bar for guiding dental models being presented to the abrasive disc.

9. A dental trimmer machine comprising a pair of abrasive discs each supported by a hub member, said hub members being rotatable about parallel axes lying in a horizontal plane, said abrasive discs being axially spaced and arranged in overlapping relationship, drive means for effecting rotation of one of said hub members, power transmission means interconnecting said hub members for effecting conjoint rotation thereof, said abrasive discs having faces to which dental models may be presented for trimming, and said abrasive discs and said hub members and said power transmission means being enclosed within a housing having a front wall with two access openings therein through which dental models may be presented to said faces of said abrasive discs for trimming.

References Cited by the Examiner

UNITED STATES PATENTS

| 222,539 | 12/1879 | Seiffert | 51—81 X |
|---|---|---|---|
| 1,193,525 | 8/1916 | Dosch et al. | 51—128 |
| 1,235,708 | 8/1917 | McIntosh | 51—240 X |
| 2,248,953 | 7/1941 | Bunch | 51—128 |
| 2,413,619 | 12/1946 | Grinnell | 51—128 |
| 2,555,707 | 6/1951 | Scott | 51—239 |
| 2,623,337 | 12/1952 | Falls | 51—239 |
| 2,741,881 | 4/1956 | Falls | 51—267 X |
| 2,974,451 | 3/1961 | Bader et al. | 51—239 |
| 3,064,400 | 11/1962 | Johnson | 51—267 |

FOREIGN PATENTS

| 1,177,635 | 4/1959 | France. |
|---|---|---|

LESTER M. SWINGLE, *Primary Examiner.*